Figure 1:
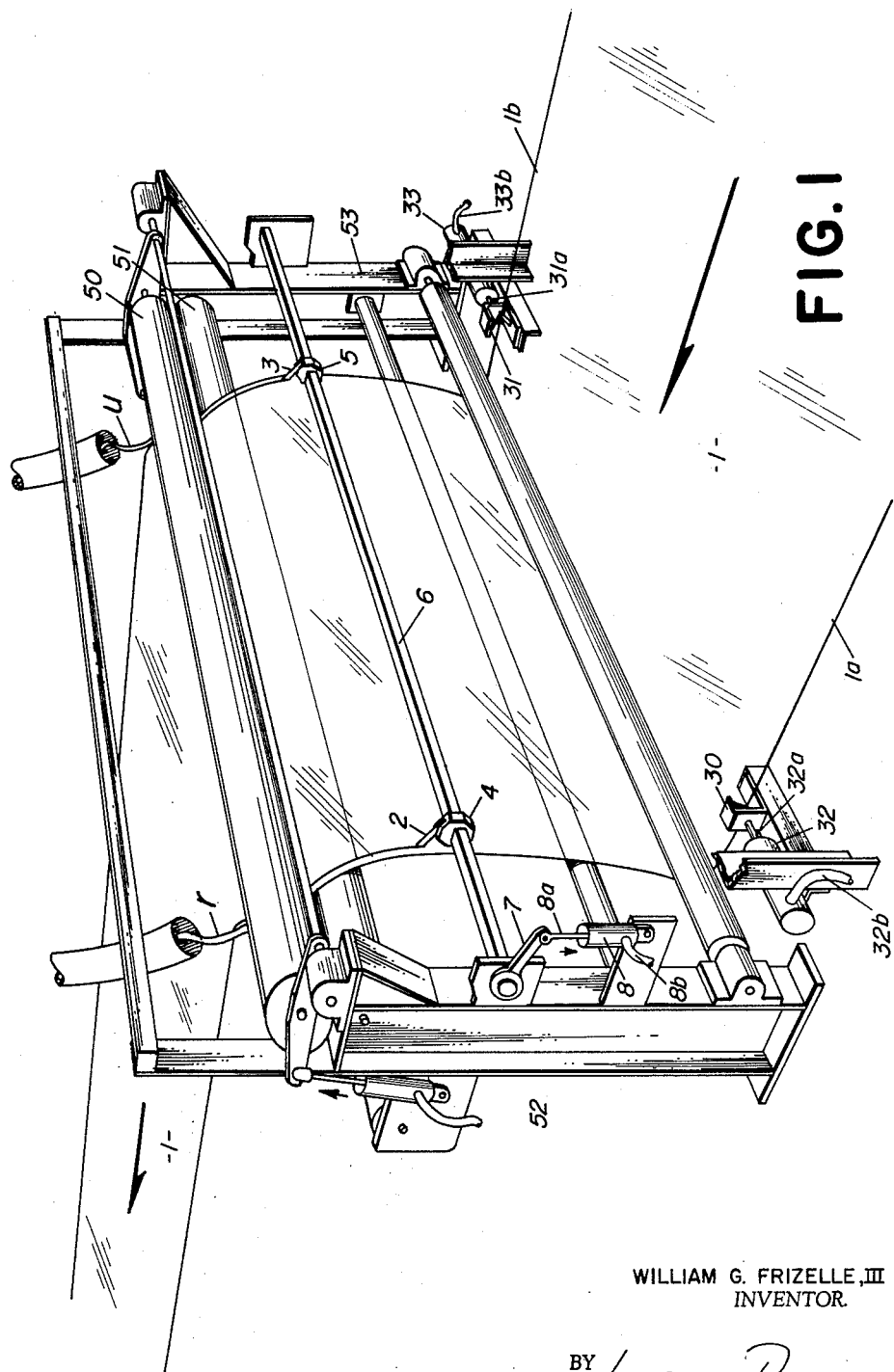

Nov. 10, 1964 W. G. FRIZELLE III 3,156,149
APPARATUS FOR TRIMMING AND WINDING SHEETED MATERIALS
Filed Sept. 26, 1962 3 Sheets-Sheet 3

WILLIAM G. FRIZELLE, III
INVENTOR.

BY Lawrence Rosen 3,156,149
APPARATUS FOR TRIMMING AND WINDING
SHEETED MATERIALS
William G. Frizelle III, Palmyra, N.Y., assignor to National Distillers and Chemical Corporation, New York, N.Y., a corporation of Virginia
Filed Sept. 26, 1962, Ser. No. 226,382
3 Claims. (Cl. 83—176)

The present invention relates to an apparatus for handling sheet materials. More particularly it relates to a system wherein such materials are drawn through a planar travel path as a substantially continuous web or sheet of material, while trimming the longitudinal edges prior to winding the trimmed web to form mill rolls thereof. The invention especially relates to means for preventing loss of tension on such web as a result of splitting and tearing of the web material especially in a lateral direction.

In addition, the invention relates to an integrated system of sensing, trimming and web deflector means operable to avoid such loss of tension and its consequences.

In the winding of mill rolls of sheeted materials, frequently it is necessary to trim the longitudinal edge portions of the material immediately ahead of the winding operation. In this trimming step the scrap material may be continuously disposed of by leading it into air conveyor hoppers and conduits to be withdrawn from the area. Also, in such operation, it is customary to maintain tension on the web in a longitudinal direction while trimming and winding. At times, under the tension applied the web may split in a transverse direction, to an extent where the trimming knives will cut through the outer ends of the break. When this happens longitudinal tension on the web is lost at the trimming station, and in a high speed operation considerable quantities of material derived from the source ahead of the trimmer will build up at the trimmer to cause clogging of the machine and damage to the material. In addition, where pneumatic conveyor means are used for removal of trim scrap the air pressure may be insufficient to rend the film causing large quantities to be drawn into the hopper and thus clog the conveyor system. Although means for sensing such breaks have been available, in the past they have been utilized to shut down the whole system, while the broken web is rethreaded to trimming and winding stations.

The problem created is intensified in the processing of the thermoplastic films, and presents especially difficult problems in operations where a continuous web of thermoplastic is moved through a tenter frame oven and laterally stretched to improve transverse orientation of the web molecular structure. In such an operation at line speeds up to about 600 feet per minute large quantities of material may build up should film winding be interrupted. To stop the traveling film may create overheating in the oven, and result in further damage to the film, to say nothing of the cost of operation downtime.

It is an object of the present invention to provide a system adapted to maintain tension on a web of thermoplastic or another material beyond a trimming or slitting station after a break in the travelling web may have occurred.

It is also an object of this invention to provide means whereby to move the untrimmed edge portions of the web out of the path of the trimmer knives and the like, whereby such remaining edge portions, especially in the vicinity of the break, may be utilized to ensure continuity of movement of the web, and to avoid downtime and complications involving any trim scrap removal system. A specific object of the invention is to provide means whereby the continuity of movement of a web of thermoplastic material having beaded edges may be maintained through the medium of such edges.

Figure 2:
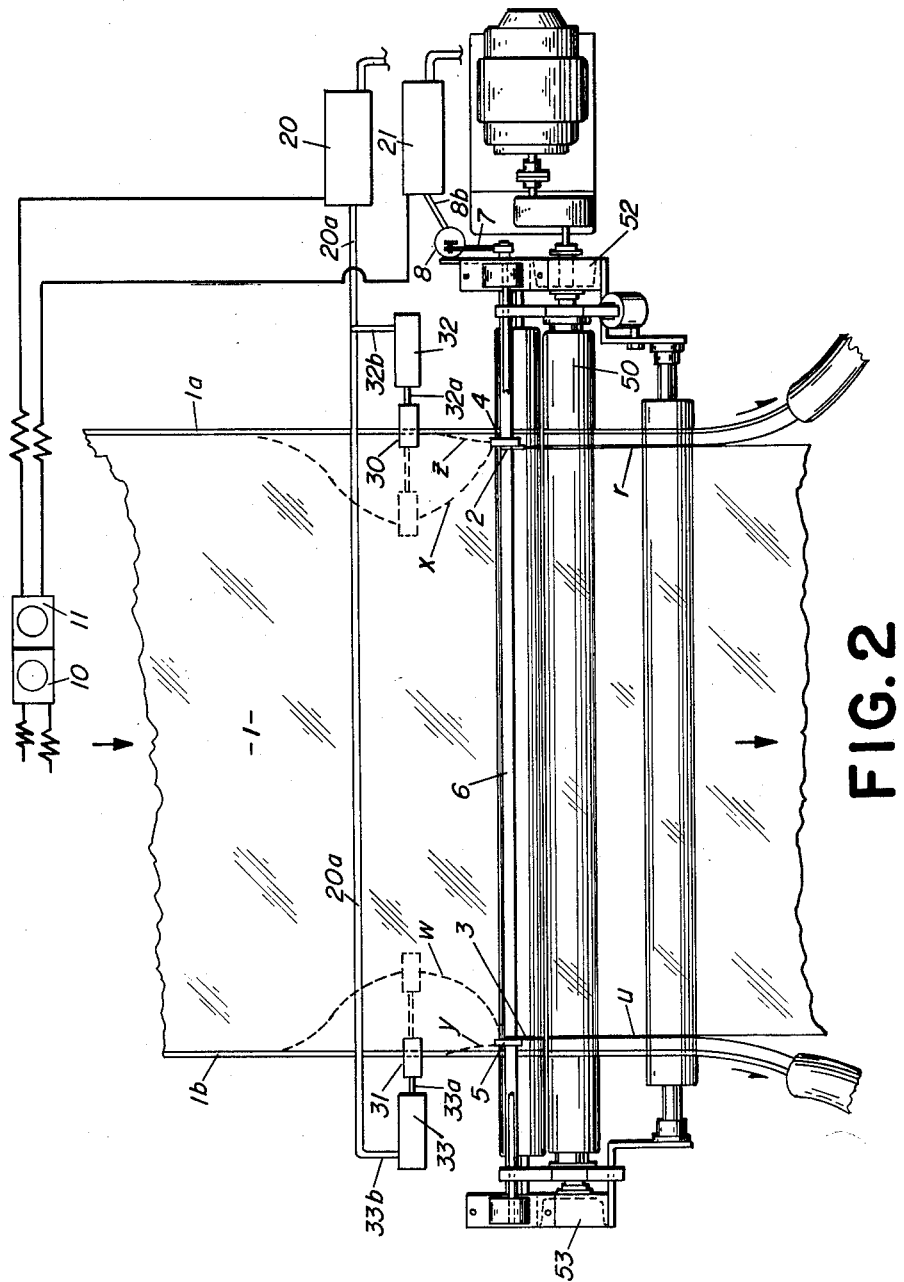
Figure 3:
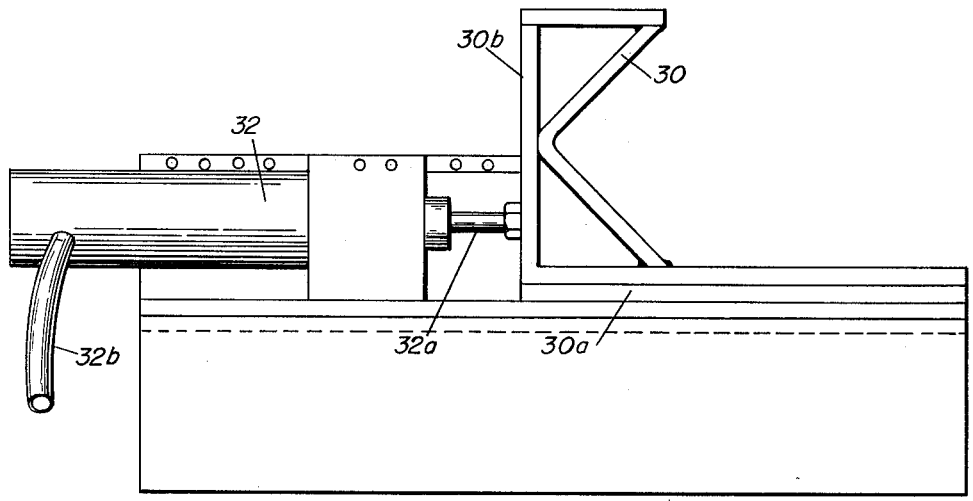

The invention and its objects may be more fully understood from the following description, when it is read in conjunction with the accompanying drawings, in which FIG. 1 is a perspective view of a portion of a production line, including the essential components of the apparatus contemplated;

FIG. 2 is a plan view of the line portion approximately as shown by FIGURE 1; and FIG. 3 is an enlarged view in side elevation of the reciprocal film guide element and operating means contemplated by the present invention as shown in both FIGS. 1 and 2.

In the drawings, the numeral 1 designates a web of a sheeted material, and specifically a web of a thermoplastic material having substantially parallel beaded edge portions 1a and 1b. As shown, these edge portions are trimmed by means of trimmer knives 2 and 3 supported, as by means of brackets 4 and 5, on a cross shaft 6. The shaft 6 is supported for limited arcuate rotation, as by means such as crank 7, and means 8. Preferably, the brackets 4 and 5 are secured in fixed relation to the shaft for rotation therewith.

Ahead of the trimmer knives, and spaced at some considerable distance therefrom is a break sensing device (FIG. 2). This device may be of any conventional form. In this instance an infra-red ray projector 10 and electronic receiver 11 are contemplated. The projector and receiver are disposed so that rays from the projector 10 are reflected by the web 1 to impinge upon the receiver 11. As thus organized the detector or sensing system is operated as a constant signal system, wherein a film break prevents reflection of the projected rays. The output of the receiver is employed to actuate operating mechanisms upon interruption of the signal, as later described, and presently designated in the drawings by the numerals 20 and 21.

Intermediate the trimmer knives 2 and 3, and the break detector elements 10 and 11, are a pair of web diverter elements 30 and 31, of which the element 30 is illustrated in greater detail by FIG. 3. These elements are disposed in substantially opposed, linearly aligned relation to each other, and normally in spaced relation to the respective web edge portions 1a and 1b. Operating means, to extend the diverter elements 30 and 31, into engagement with the web edges, and inwardly toward the center of the web travel path are designated by the numerals 32 and 33. Such means, as also the means 8 may be actuated pneumatically, hydraulically or electrically.

In the apparatus here described, a pneumatic system is contemplated. For such purpose the elements 8, 32 and 33 are pneumatic cylinders, including plunger rods 8a, 32a and 33b respectively, with supply control means in the conduits intermediate the source and the elements.

As shown in FIG. 2, such means have been designated by the numerals 20 and 21. The means 21 is connected directly in the conducit 8b, while the means 20 is connected to each of the conduits 32b and 33b by way of a manifold 20a. These control means, in the pneumatic system shown, each include solenoid means to activate an air valve in the respective conduit means. The control 21 additionally includes a time delay relay. The time delay relay permits action of the diverter elements to displace the edge portions of the web inwardly to an extent where the beaded edge portions are established on lines which clear the knives 2 and 3. Initial displacement of the web causes the knives to cut through the beaded edge portions 1a and 1b. In FIGS. 1 and 2, the trim lines normal to the operation are solid lines designated by the letters u and r.

In FIG. 2, the lines of the diverted edge portions are dashed lines designated by the letters w and x. Diversion of the web edges will cause the knives to cut through the diverted edges and the beaded portion thereon, substantially as indicated by the dashed lines y and z.

Beyond the knives 2 and 3 in the web travel path are a pair of nip rolls 50 and 51. These rolls move the web over the knives, and pass the film onwardly, as to a web winder device (not shown). By diverting the beaded, heavier gauge edge portions 1a and 1b inwardly, initially the main body of the web continues to be drawn through the nip rolls. Then with the knives 2 and 3 withdrawn, the untrimmed edges are engaged by the nip rolls. In this fashion the web may be passed through the nip rolls, with tension maintained in the vicinity of the break by means of the untrimmed edge portions. With the web continuing to move through the nip rolls, an operator is able to handle the damaged portion beyond them without interruption, or loss of continuity ahead of the rolls. Support for the nip rolls 50 and 51; cross shaft 6; and the operating means therefor is provided by uprights or standards 52 and 53. As shown, the web diverter elements are separately supported, but also may be carried by suitable brackets mounted on the standards 52 and 53.

Referring now to FIG. 3 in greater detail, the diverter element 30 includes a shoe portion 30a, adapted to slide on a track or rail support, on which is mounted a K-frame element 30b, having a closure brace 30c across the top and substantialy in parallel relation to the shoe. The arms of the frame are disposed to open toward the web edge when the element is mounted for use, as shown in FIG. 1. Preferably the juncture of the frame arms is shaped to avoid binding of the web edge therein.

The apapratus according to the present invention has been described with reference to a slitting operation wherein a web is transported in a travel path extending longitudinally of the web, and wherein the web is slit so as to separate opposite edge portions therefrom. As should be evident, however, this apparatus is adapted for application in any slitting operation, such as one in which the web is divided longitudinally into two or more sections with or without trimming of the longitudinal edge portions.

In operation, when a rupture or break in the web interrupts the constant signal produced by the receiver 11, an electrical impulse is transmitted to each of the control means 20 and 21. In the means 20, the impulse activates a solenoid, which in turn actuates a valve in the air manifold 20a, opening the valve to energize the dirverters through the conduits 32b and 33b. When energized, the diverter elements 30 and 31 are extended to move the web edges inwardly to clear the knives 2 and 3, and in doing so cause the knives to cut through the web edge portions. In the means 21, the impulse received also activated a solenoid to actuate a valve in the conduit 8b. In this instance, however, the impulse passes through a time delay relay. The relay has a period sufficient to permit diversion of the web edges to allow the slitter knives to cut through the edges before the knives are moved away from the web by activation of the means 8.

As soon as the ruptured portion of the web has passed beyond the sensing means 10 and 11, the normal condition is restored. As this occurs the diverter means 30 and 31 are withdrawn from their extended position, and again after a time delay period, the knives 2 and 3 are again engaged in the web slitting or trimming position by actuation of the means 8.

What is claimed is:

1. In an apparatus for slitting a transported web of a sheeted material, including nip rolls for transporting the web, and means for detecting a break in said web ahead of said nip rolls, a means for avoiding separation of said web between the point of detection and said nip rolls, which comprises in sequence a pair of web diverters elements aligned laterally of said web; means for extending said diverter elements inwardly toward the web center; slitter knives normaly disposed in intercepting relation to said web travel path intermediate said diverter elements and said nip rolls; and means energized by an electrical signal from said break detector to actuate said diverter element extension means, and means to withdraw and restore said knives from and to said intercepting relation to said web in a timed sequence.

2. An apparatus according to claim 1 wherein said means to extend said diverter elements, and to withdraw and restore said knives each comprises a cylinder and a plunger movable reciprocally therein.

3. In an apparatus of the character described, including a pair of nip rolls adapted to move a web of sheeted material through a predetermined travel path, means for detecting breaks in said web disposed ahead of said nip rolls, and slitter knives disposed intermediate said detector means and nip rolls whereby normally to intercept said said web travel path, the improvement which comprises means for diverting said web edge portions from intercepting relation to said knives in said travel path; means for withdrawing said knives from said intercepting relation to said web travel path; and means for actuating said diversion and withdrawal means respectively in a timed sequence wherein said actuating means are activated by a signal transmitted from said detector means upon occurrence of a break in said web.

No references cited.